US011199830B2

United States Patent
Hoferer et al.

(10) Patent No.: US 11,199,830 B2
(45) Date of Patent: Dec. 14, 2021

(54) OPERATING SYSTEM FOR A MACHINE OF THE FOOD INDUSTRY

(71) Applicant: Krones AG, Neutraubling (DE)

(72) Inventors: Maximilian Hoferer, Regensburg (DE); Sebastian Vogl, Regensburg (DE); Thomas Stauber, Obertraubling (DE); Johannes Reschke, Langquaid (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/092,438

(22) PCT Filed: Mar. 30, 2017

(86) PCT No.: PCT/EP2017/057598
§ 371 (c)(1),
(2) Date: Oct. 9, 2018

(87) PCT Pub. No.: WO2017/186450
PCT Pub. Date: Nov. 2, 2017

(65) Prior Publication Data
US 2019/0107823 A1    Apr. 11, 2019

(30) Foreign Application Priority Data
Apr. 26, 2016   (DE) .................... 10 2016 207 009.6

(51) Int. Cl.
*G05B 19/409*    (2006.01)
(52) U.S. Cl.
CPC .. *G05B 19/409* (2013.01); *G05B 2219/23148* (2013.01); *G05B 2219/24012* (2013.01);
(Continued)
(58) Field of Classification Search
CPC ........ G05B 19/409; G05B 2219/23148; G05B 2219/24012; G05B 2219/32014; G05B 2219/35482; G10L 15/22; G10L 15/32
See application file for complete search history.

(56) References Cited

U.S. PATENT DOCUMENTS 8,217,856 B1 *   7/2012   Petrou ..................... G06F 3/011
                                                              345/8
9,478,115 B2   10/2016   Hahn et al.
(Continued)

FOREIGN PATENT DOCUMENTS

CN   203858414   * 10/2014  ............. G02B 27/01
CN   104704433 A   6/2015
(Continued)

OTHER PUBLICATIONS

English Translation of DE 10 2012 217573, dtd Mar. 27, 2014.*
(Continued)

*Primary Examiner* — Patrick N Edouard
*Assistant Examiner* — Eboni N Giles
(74) *Attorney, Agent, or Firm* — Lowenstein Sandler LLP (57) ABSTRACT

The present disclosure relates to an operating system for a machine of a food industry. The operating system includes eyeglasses for a user of the operating system and a transceiver for exchanging data between the operating system and the machine. The eyeglasses include a display system configured to display a control element and information of a human machine interface (HMI). Furthermore, the operating system includes at least one input module which receives user input from the user with respect to the control element. The operating system additionally includes a processing module. The processing module converts the received user input into an input signal for controlling at least one of the machine or the HMI.

20 Claims, 3 Drawing Sheets

(52) U.S. Cl.
CPC .............. *G05B 2219/32014* (2013.01); *G05B 2219/35482* (2013.01)

(56) References Cited

U.S. PATENT DOCUMENTS

| | | | |
|---|---|---|---|
| 2004/0046711 A1* | 3/2004 | Triebfuerst | G05B 19/409 345/8 |
| 2012/0235896 A1 | 9/2012 | Jacobsen et al. | |
| 2015/0248826 A1* | 9/2015 | Hahn | G02B 27/017 340/539.11 |
| 2016/0034254 A1* | 2/2016 | LeBeau | G06F 3/011 704/275 |
| 2016/0054791 A1* | 2/2016 | Mullins | G06T 19/006 345/173 |
| 2017/0108918 A1* | 4/2017 | Boesen | G06F 1/163 |
| 2017/0111723 A1* | 4/2017 | Boesen | G06F 21/32 |
| 2018/0039259 A1* | 2/2018 | Hoferer | G05B 19/41845 |
| 2018/0321832 A1* | 11/2018 | Bielmeier | G06F 3/04847 |

FOREIGN PATENT DOCUMENTS

| | | |
|---|---|---|
| DE | 10 2012 217573 A1 | 3/2014 |
| EP | 0 0 83 725 A2 | 7/1983 |
| WO | 02/50649 A2 | 6/2002 |
| WO | 0250649 A2 | 6/2002 |
| WO | 2007/066166 A1 | 6/2007 |

OTHER PUBLICATIONS

English Translation of CN 203858414 (Year: 2014).*
English Translation of CN 104704433 (Year: 2015).*
International Search Report and Written Opinion dated Jun. 26, 2017, on application No. PCT/EP2007/057598.
Daude, R.; Schlick et al., "Head-Mounted Display als facharbeiterorientierte Unterstützungskomponente an CNC-Werkzeugmaschinen" Springer, vol. 86, Issue No. 5, Berlin, DE., May 1, 1996, pp. 248-252.
Chinese Office Action dated Aug. 28, 2020, on Application No. 201780025335.0.

* cited by examiner

OPERATING SYSTEM FOR A MACHINE OF THE FOOD INDUSTRY

RELATED APPLICATIONS

This Application claims the benefit under 35 U.S.C. § 371 of International Patent Application No. PCT/EP2017/057598, filed Mar. 30, 2017, which claims the benefit of German Application No. 10 2016 207 009.6, filed Apr. 26, 2016, which are incorporated by reference in their entirety.

TECHNICAL FIELD

The present disclosure relates to an operating system for a machine in the food industry (e.g., the beverage industry).

BACKGROUND

A user of beverage processing systems typically operates the individual machines by way of an operating system. For example, individual procedures in the machine can be triggered, parameters can be set and/or alarm or warning signals can be received by the operating system. Stationary operating devices (and increasingly also mobile operating devices) are typically employed, where the mobile operating devices are compatible with the entire system or can be used for various machines, respectively. The user can carry a mobile operating device along to the respective machine and, at the same time, execute or monitor the functions of other machines.

A human machine interface (HMI) provides the user with a software interface for settings, control operations, control elements and information from machines. In general, the HMI is displayed via a display which is mounted on the machine itself and is operated by the user, for example, by way of a touch-sensitive display. Alternatively, an HMI can also be displayed and operated on a mobile operating device, such as a mobile telephone, laptop or tablet computer.

For example, the user places the mobile operating device in the region of a particular machine and can keep an eye on the display of the mobile operating device for displaying the HMI during operations or also repair procedures in order to read information therefrom and to operate and set the machine via the HMI. The user can also control individual components of the machine by way of the operating device in order to carry out the operations or even repairs.

Such operating systems with mobile operating devices often prove to be non-ergonomic in practice, since they are attached or kept on the body, in bags or brackets and are therefore not visible at all times. When the user then takes the operating device in one hand, then he/she no longer has this hand free to carry out operations, repairs, maintenance and/or set-up operations at the machine. At the same time, the user must always look away from the part of the machine that is to be operated/repaired in order to read the display of the operating device.

Furthermore, the use of HMIs, whether installed in a stationary or mobile manner, also entails hygienic limitations, since an HMI is often used not only by one individual, but is often operated and touched by many different users. As a result, germs spread easily, which is very problematic in the food industry (e.g., in antiseptic areas).

BRIEF DESCRIPTION OF THE DRAWINGS

Embodiments of the present disclosure are illustrated by way of example, and not by way of limitation, in the figures of the accompanying drawings.

DETAILED DESCRIPTION

The present disclosure may provide an operating system for a machine which is more ergonomic to handle and offers sufficient hygienic protection.

The operating system may be for a machine in the food industry (e.g., in the beverage industry). The operating system may include eyeglasses for a user of the operating system and a transceiver for exchanging data between the operating system and the machine.

The eyeglasses include a display system which is designed (e.g., as a head-mounted display or virtual retina display, or a projector and is configured to display a control element and information of an HMI. Furthermore, the operating system includes at least one input module which allows user input with respect to at least one of the control elements. The operating system additionally includes a processing module. The processing module converts the recorded user input to an input signal for controlling the machine and/or the HMI.

Examples of the input module can be one or more of a microphone for voice input, an external camera for gesture recognition, or an internal camera for input by way of the eye. All or at least some of the various input modules can also be combined. Respective processing modules can be a speech recognition module and a visual recognition module. The processing module converts user input into corresponding signals for controlling the HMI and/or the machine.

In some embodiments, the user can see an HMI of a machine through the eyeglasses while at the same time seeing the machine itself. In some embodiments, the user can execute speech input via the microphone, whereby the speech input is understood by the speech recognition module and is converted into an input signal. In some embodiments, the user can use a respective voice command for the selection of a control element displayed in the HMI, or a speech command to navigate through the menu of the HMI, such as "scroll down" or "page forward" in an HMI menu.

In one embodiment, the user input for the HMI displayed in the eyeglasses can also be provided via a mobile device carried by the user. The mobile device can include a microprocessor, a keyboard and/or a display. In some embodiments, the display is touch-sensitive. The mobile device can also include individual control buttons. The mobile device can be a tablet computer or a smartphone.

Responsive to the HMI being displayed via a pair of eyeglasses, the user's eyes are protected from dangerous foreign objects. Responsive to the HMI being displayed via a pair of eyeglasses, information and the HMI are displayed to the user directly via the eyeglasses. Due to the various input options for controlling the machine, the user has both hands free to carry out repairs. The various input options may also meet increased requirements in terms of hygiene. The operating system therefore enables operation and control (e.g., complete operation and control) of the machine without requiring a user of the machine to touch the various buttons or physical HMIs. In addition, the user can also be shown in the eyeglasses whether alarms or warnings of that machine or of other machines are given.

The operating system can be designed for operating the machine, several machines, an entire system and/or also several systems. The operating system according to the present disclosure therefore ergonomically supports the user during operating procedures and offers a variety of possible input forms for navigating through an HMI of the machine.

The machine can be arranged in a beverage processing system. The machine can include computer-based machine controls. The machine can be a beverage processing machine and/or a container treatment machine. In some embodiments, the machine is a stretch-blow machine, a rinser, a filler, a sealer, a labeler and/or a packaging machine or other beverage processing machine and/or other container treatment machine.

The eyeglasses can also be designed for protection against mechanical, thermal, chemical, biological, electrical and/or optical hazards. The eyeglasses can be designed according to legal standards for safety at work.

The display system can be implemented as a head-mounted display (HMD). In a head-mounted display, imaging optics can be arranged in front of the eye in a manner generating a virtual image of a display in front of the user's eye. The imaging optics of the head-mounted display can be configured to be semi-transparent (e.g., where the user can see a superimposition of the environment together with the information of the display). Alternatively, the display system can be designed as a virtual retina display, in which an image is projected directly onto the retina of the eye. The virtual retina display can include a laser. The display system can also be designed as a projector with which the information is projected onto a surface beyond the eyeglasses. The projector can include a laser and a scanning unit. In this way, an image can be projected directly onto the environment by deflection of the laser. The projector can also be designed as a miniature projector. In some embodiments, a display is illuminated by a light-emitting diode (LED) and is imaged with an optical system. The display of the head-mounted display or the projector, respectively, can be a liquid crystal display (LCD), a digital light processing (DLP) device or a liquid crystal on silicon (LCoS) device. However, further implementation options are conceivable.

The transceiver can be adapted to transmit data between the eyeglasses and one or more machines via cable, fiber optic or wirelessly via an air interface. The term air interface refers to the transmission of data by way of electromagnetic waves, which includes the following transmission methods: radio-frequency identification (RFID), mobile radio, wireless local area network (WLAN), global system for mobile communications (GSM), universal mobile telecommunications system (UMTS), long-term evolution (LTE), (GSM enhanced data rates for GSM evolution (EDGE) radio access network (GERAN), universal terrestrial radio access network (UTRAN), evolved UTRAN (E-UTRAN)), Bluetooth, WiMAX, and infrared data association (IrDA). In some embodiments, the transceiver can include a WLAN or Bluetooth interface. The transceiver can include a receiver unit and/or a transmitter unit.

In the operating system, the eyeglasses can also include headphones, by use of which acoustic signals and instructions from the HMI can be reproduced. The headphones can be designed as in-ear headphones. The eyeglasses can also include hearing protection that suppresses disturbing ambient noise. The hearing protection may operate with active noise control. As a result, the user may not need separate hearing protection, which would then exert pressure onto the head while wearing the eyeglasses. The hearing protection can suppress very loud ambient noise. With active noise control, an acoustic counter-signal can be generated so that disturbing ambient noise is eliminated in the ear by interference. This may suppress the disturbing ambient noise.

With the operating system, the eyeglasses can include an external camera for recording objects in the field of vision of the user. The images recorded by the external camera can be transmitted via the transceiver for storage and/or for communication purposes with colleagues. This allows colleagues of the user to directly see what the user has in the field of vision and can then support the user when servicing the system. Furthermore, the environment image of the first camera can be displayed to the user via the display system (e.g., where the eyeglasses are configured not to be transparent). The first camera can be a charge-coupled device (CCD) or complementary metal-oxide (CMOS) camera with a lens. The operating system can include an image evaluation unit. The image evaluation unit may be designed to automatically recognize objects in the image data. This allows information about the objects present in the field of vision to be displayed to the user automatically in the display system of the eyeglasses.

The external camera can furthermore also be used to record user input by way of user gestures. For example, the external camera can record the user's hands and a visual recognition module of the operating system can convert the gestures of the user's hands to an input signal for the HMI and/or the machine. This allows the user to send hands-free commands to the HMI by way of gestures. This further simplifies interaction with the HMI and does not require any buttons, switches or other physical control elements or surfaces.

The eyeglasses can include one or more internal cameras, which are adapted to detect at least one eye of the user. In this way, the viewing direction of the user can be detected. The images of the internal camera are transmitted to the visual recognition module, which is configured to interpret motions and viewing directions of the eye. Based on the user viewing direction detected, the visual recognition module can generate a corresponding input signal for interaction with the HMI and/or the machine. For example, when the eye-based user input has previously been activated, a user, by use of the internal camera, can select a control element of the HMI displayed in the eyeglasses by focusing their eye on this control element and, for example, rapidly blinks twice. In this example, the selection of the control element corresponds to the focusing of the eye on the control element and the confirmation of execution of the functionality of the control element corresponds to the user rapidly blinking twice. However, other forms and mechanisms of input can also be used to enter a confirmation into the eyeglasses for the execution of a selection.

In one embodiment, the visual recognition module can also combine the user input of the external camera and the internal camera to make an even larger number of different forms of input available.

The above-mentioned various input options can respectively be combined with each other to provide the user with a maximum number of input options. The combination of various input options for controlling the HMI results in a very flexible mode of operation without the need to touch the machine or the control elements of the machine.

The operating system can include a positioning system for detecting the position and/or orientation of the eyeglasses. The positioning system may be arranged at least in part on the eyeglasses. The positioning system can include one or more of the following technologies: RFID, Bluetooth, WLAN or ultra-wideband (UWB). The positioning system can also include acceleration sensors and/or position sensors. The positioning system can include a tracking system and markers which are recognizable (e.g., to the tracking system). The tracking system can be in fixed relation with the machine and the markers can be attached to the eyeglasses. In some embodiments, the tracking system is attached to the eyeglasses and the markers are attached to the machine. In some embodiments, the external camera records the markers as image data. As a result, the position of the eyeglasses and thus the viewing region of the user relative to the machine can be detected, and, accordingly, only a corresponding HMI intended for objects and/or machines in the field of vision can respectively be displayed to the user. If the visual recognition module detects that the user is viewing a particular part of a machine, then the visual recognition module can generate one or more input signals to display the corresponding menu or the corresponding control elements of the particular part of the machine to the user in the HMI in the eyeglasses.

In addition, the location of the user in the overall system can be determined via the positioning system. This allows the user to be easily found by colleagues. Detection of the position and/or the orientation of the eyeglasses can be effected relative to the machine.

The eyeglasses can also be connected to a haptic system, such as a vibration unit, that delivers haptic feedback once an alarm occurs or a short vibration pulse once a user selection is effected via the eyeglasses. The haptic system can be attached to the user's body or to the eyeglasses. The haptic system does not disturb the user at work. Integration of the haptic system into the eyeglasses allows the haptic feedback to be perceivable by the user.

The haptic system can include a vibrator, an acoustic haptic system and/or an optical haptic system. The vibrator gives the user an activation stimulus, which the user can perceive independently of the sound volume in the environment. The same may also be achieved by the optical haptic system. In addition, the user can be made aware by the acoustic haptic system of the alarm and/or the warning signals, should the user have no direct visual contact with the haptic system. The haptic system can reproduce different types of alarm and/or warning signals as differently coded vibration, sound and/or light signals. The different coding can have different intensities or rhythms. The optical haptic system can display different alarm and/or warning signals using different colors. The optical haptic system can include a display.

The display system in the eyeglasses can be adapted to display to the user a different image onto each eye (e.g., to display 3D information). 3D information can be three-dimensional information. This allows the information to appear virtually in the room to the user. This allows the user to distinguish the information in an easy manner.

Figure 1:
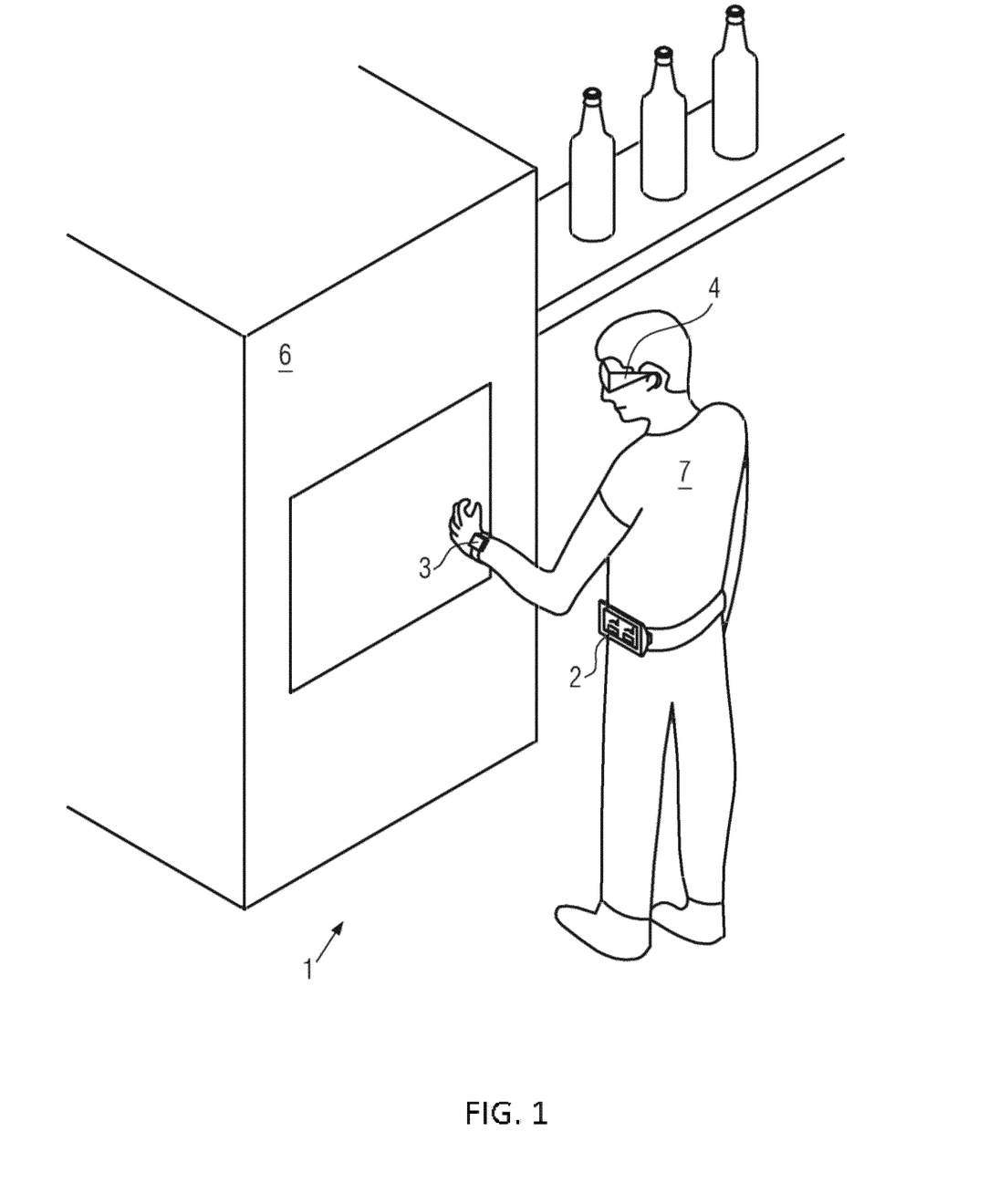
FIG. 1 illustrates a perspective view of an operating system, according to certain embodiments.

FIG. 1 shows a perspective view of an operating system 1 according to the present disclosure. It can be seen there that a user 7 is standing in front of a machine 6 in order to operate or service the machine 6. Machine 6 illustrated is a machine in the food industry (e.g., the beverage industry).

User 7 is wearing a belt to which a mobile device 2 is attached. However, mobile device 2 can also be carried in a pocket of user 7 and is not necessarily attached to a belt of user 7. At the same time, user 7 is wearing a pair of eyeglasses 4 including a display system and embodied as a head-mounted display. User 7 is thereby presented control elements and information of a human machine interface (HMI) in the field of vision. User 7 is wearing a haptic system 3 on his/her left arm. Haptic system 3 includes one or more of a vibrator, an acoustic haptic system, or an optical haptic system. Different alarm and/or warning signals can be transmitted therewith to user 7 independently of the display system in eyeglasses 4. This reduces the likelihood of user 7 not noticing these signals.

During servicing or operation of machine 6, user 7 has both hands free to perform manual operations. At the same time, respective control elements of the HMI and information on the status of machine 6 are displayed to user 7 via the display system in eyeglasses 4. It is also possible that user 7 is, via the display system, displayed documentations of machine 6 with which the user can perform a servicing or operation.

User 7 can control machine 6 by use of an HMI which is displayed in eyeglasses 4. Various forms of input, such as speech, eye gestures, hand gestures or via mobile device 2, are available to user 7.

Figure 2:
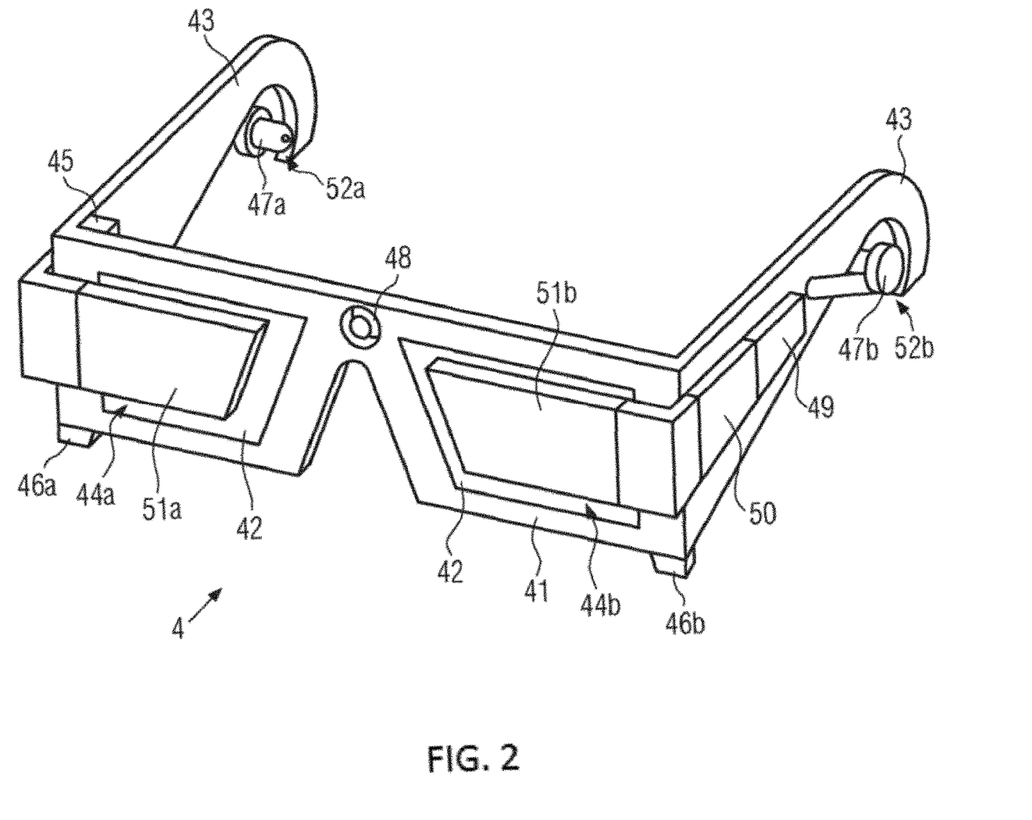
FIG. 2 illustrates a perspective view of the eyeglasses of the operating system, according to certain embodiments.

FIG. 2 shows a perspective view of eyeglasses 4 of the operating system according to the present disclosure from FIG. 1. An eyeglasses frame 41 is shown in which safety lenses 42 are inserted. Furthermore, eyeglasses 4 include two arms 43 which are worn over the ears of user 7.

A display system 44a, 44b is arranged in front of each lens 42 of eyeglasses 4. The display system 44a, 44b may both be implemented as head-mounted displays 51a, 51b. The head-mounted displays 51a, 51b include optical systems with which different images of LCD or organic LED (OLED) displays are displayed for each eye separately to user 7. Head-mounted displays 51a, 51b are semi-transparent so that user 7 can simultaneously see the environment in front of eyeglasses 4. With display system 44a, 44b, user 7 can be shown images that are different for each eye so that the user can also view three-dimensional information. The user 7 may see through the eyeglasses 4, firstly, the surroundings and, secondly, superimposed virtual information, such as the HMI of a machine.

In addition, eyeglasses 4 may include earphones 47a and 47b. The earphones 47a, 47b may be designed as hearing protection 52a, 52b. Headphones 47a, 47b are designed as a plug for each ear (in-ear headphone), so that the headphones 47a, 47b seal against the auditory canal. This suppresses disturbing ambient noise which then may not enter the auditory canal. At the same time, microphones 46a and 46b detect the disturbing ambient noise from the exterior and additionally output a compensation signal through headphones 47a, 47b, so that the remaining ambient noise is further reduced. In addition, useful signals, such as human voices, are detected by microphones 46a, 46b and filtered out by a filter unit (presently not shown) and are inputted via headphones 47a, 47b separate from the ambient noise. This allows user 7 to communicate with colleagues on site.

Also shown is a transceiver 50 which is implemented as a wireless radio interface. The radio interface can be a WLAN or Bluetooth interface. With transceiver 50, eyeglasses 4 can be in communication with mobile device 2 of FIG. 1. Eyeglasses 4 can also be in communication with haptic system 3 from FIG. 1. Data can be exchanged between the units via this communication.

Transceiver 50 is further configured to transmit control signals and input signals from eyeglasses 4 to machine 6 for controlling the HMI. Conversely, the eyeglasses also receive information and program signals via transceiver 50 for displaying the HMI of machine 6.

Eyeglasses 4 also include an external camera 48 which is directed forwardly and detects the field of vision of user 7. External camera 48 generates image data from the environment directly in front of user 7, where it can be passed on to colleagues via transceiver 50 so that the colleagues can assist user 7 in performing the servicing. Furthermore, external camera 48 detects the hands of user 7 in order to record the gestures thereof as image sequences. The images thus obtained can be transmitted to a visual recognition module in order to convert the gesture-controlled user input to an input signal for controlling machine 6 and/or the HMI. Objects in the field of vision of user 7 can also be automatically recognized from the image data.

Furthermore, eyeglasses 4 may include at least one internal camera 45 which is directed at one eye of user 7. Image data from internal camera 45 is likewise forwarded to the visual recognition module in order to analyze user input and generate corresponding input signals for controlling machine 6 and/or the HMI.

In addition, eyeglasses 4 may include a positioning system 49 with which the orientation and position of eyeglasses 4 can be determined. Positioning system 49 may include acceleration sensors and position sensors. The orientation and position of the head of user 7 relative to machine 1 can thus be determined in order to display, for example, corresponding alignment information via display system 44a, 44b, relative to which specific machine elements are to be positioned.

Eyeglasses 4 also may include a microprocessor as a control unit and a battery for power supply (presently not shown).

Figure 3:
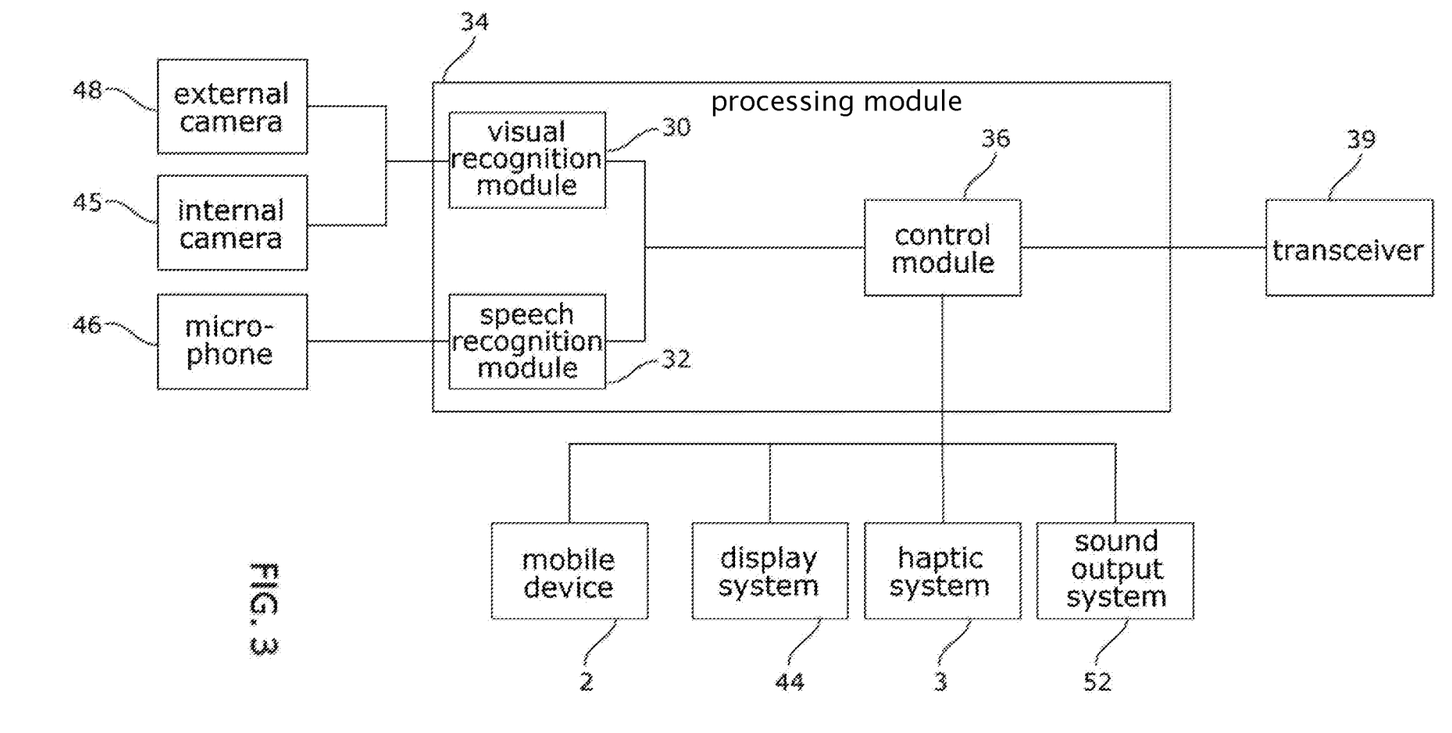
FIG. 3 illustrates a block diagram of the modules of the eyeglasses of the operating system, according to certain embodiments.

FIG. 3 is a block diagram of the modules of the eyeglasses of the operating system according to the present disclosure from FIG. 1. Eyeglasses 4 include various input systems, such as external camera 48, internal camera 45 and microphone 46. In addition, eyeglasses 4 include various output systems, such as display system 44, haptic system 3 and sound output system 52. In addition, a mobile device 2, which can be operated both as an input system and as an output system, can also be coupled to the eyeglasses.

The input modules are connected to a processing module 34 in order to respectively process the user input and to convert it into input signals for controlling the machine and/or the HMI. The processing module can include at least one visual recognition module 30 and at least one speech recognition module. External camera 48 and internal camera 45 are connected to visual recognition module 30. The microphone is connected to speech recognition module 32.

Processing module 34 can further include a control module 36 which controls the activities and the individual operations of the visual recognition module 30 and the speech recognition module 32. Furthermore, control module 36 can exchange data and signals with transceiver 39 and the individual output systems. In some embodiments, mobile device 2 can communicate directly with control module 36.

In one embodiment, processing system 34 is a component of eyeglasses 4. In some embodiments, the processing module can be disposed remotely, for example, in mobile device 2. In this case, the eyeglasses can be manufactured having less weight and being of smaller size, which allows for more wearing comfort. In the event that processing module 34 is contained in the mobile device, external camera 48, internal camera 45, and microphone 46 communicate directly with transceiver 39, or the eyeglasses further include another control module which is in charge of the communication of the input modules with transceiver 39.

When processing module 34 is connected in the mobile device, the communication between the input modules and mobile device 2 can likewise take place via transceiver 39 or via a further transceiver which is configured only for communication between eyeglasses 4 and mobile device 2. The communication between the eyeglasses and the mobile device can be wireless or wired.

Further input modules, such as near-field communication (NFC), an electronic stylus, and any suitable form of sensor, can be added to the above input modules (external camera 48, internal camera 45, microphone 46, mobile device 2). Also the output systems described herein (display system 44, haptic system 3, sound output system 52, mobile device 2) are not of a restrictive nature, but other output systems can also be provided.

It is understood that the features mentioned in the embodiments described above are not restricted to these specific combinations and are also possible in any other combination.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. An operating system for a machine in a beverage industry, wherein the machine is at least one of a beverage processing machine or a container treatment machine, wherein the operating system comprises:
    eyeglasses for a user of the operating system, wherein the eyeglasses comprise a display system adapted to display a first control element and information of a human machine interface (HMI) for controlling settings or operations of the machine in the beverage industry or at least one component of the machine;
    a transceiver for exchanging data between the operating system and the machine;
    at least one input module adapted to receive user input from the user with respect to the first control element, wherein the at least one input module comprises a microphone for inputting speech information; and
    a processing module adapted to:
        convert the received user input into one or more first input signals and one or more second input signals;
        cause the one or more first input signals to be transmitted via the transceiver to the machine to control the settings or the operations of the machine or the at least one component of the machine; and
        cause the one or more second input signals to control the HMI displayed on the display system of the eyeglasses, wherein the processing module comprises a speech recognition module adapted to convert the inputted speech information into:
            a first input signal to be transmitted via the transceiver to the machine to control the settings or the operations of the machine in the beverage industry or the at least one component of the machine; and
            a second input signal to navigate a menu of the HMI displayed on the display system of the eyeglasses.

2. The operating system of claim 1, wherein the at least one input module further comprises an external camera for inputting a gesture, and wherein the processing module further comprises a visual recognition module which is adapted to convert the inputted gesture into a third input signal to be transmitted via the transceiver to the machine in the beverage industry to control the settings or the operations of the machine in the beverage industry or the at least one component of the machine.

3. The operating system of claim 1, wherein the at least one input module further comprises an internal camera for detecting at least one of a viewing direction or a motion of at least one eye of the user, and wherein the processing module further comprises a visual recognition module which is adapted to convert at least one of the detected viewing direction or the detected motion into a third input signal to be transmitted via the transceiver to the machine in the beverage industry to control the settings or the operations of the machine in the beverage industry or the at least one component of the machine.

4. The operating system of claim 1, wherein the at least one input module further comprises a mobile device which is in communication with the eyeglasses and which is configured for direct input of a fourth input signal to be transmitted to the machine in the beverage industry to control the settings or the operations of the machine in the beverage industry or the at least one component of the machine.

5. The operating system of claim 1, wherein the operating system is adapted to operate the HMI of the machine without the user touching the machine and without the user touching control elements on the machine.

6. The operating system of claim 1, wherein the operating system comprises a positioning system for detecting at least one of a position or orientation of the eyeglasses and is adapted to select the first control element and the information of the HMI to be displayed based on the at least one of the position or the orientation of the eyeglasses.

7. The operating system of claim 1, wherein at least one of the first control element or the information of the HMI are displayed at least one of in the eyeglasses or on an external display screen.

8. The operating system of claim 1, wherein:
the display system is at least one of a head-mounted display, a virtual retina display, or a projector; and
the settings or the operations comprise one or more of operations, repairs, maintenance, or set-up operations at the machine.

9. Eyeglasses for a user of an operating system, wherein the operating system is for a machine in a beverage industry, wherein the machine is at least one of a beverage processing machine or a container treatment machine, wherein the eyeglasses comprise:
a display system adapted to display a first control element and information of a human machine interface (HMI) for controlling settings or operations of the machine in the beverage industry or at least one component of the machine;
a transceiver for exchanging data between the eyeglasses and the machine;
at least one input module adapted to receive user input from the user with respect to the first control element, wherein the at least one input module comprises a microphone for inputting speech information; and
a processing module adapted to:
convert the received user input into one or more first input signals and one or more second input signals;
cause the one or more first input signals to be to be transmitted via the transceiver to the machine to control the settings or the operations of the machine or the at least one component of the machine; and
cause the one or more second input signals to control the HMI displayed on the display system of the eyeglasses, wherein the processing module comprises a speech recognition module adapted to convert the inputted speech information into:
a first input signal to be transmitted via the transceiver to the machine to control the settings or the operations of the machine in the beverage industry or the at least one component of the machine; and
a second input signal to navigate a menu of the HMI displayed on the display system of the eyeglasses.

10. The eyeglasses of claim 9, wherein the at least one input module further comprises an external camera for inputting a gesture, and wherein the processing module further comprises a visual recognition module which is adapted to convert the inputted gesture into a third input signal to be transmitted via the transceiver to the machine in the beverage industry to control the settings or the operations of the machine in the beverage industry or the at least one component of the machine.

11. The eyeglasses of claim 9, wherein the at least one input module further comprises an internal camera for detecting at least one of a viewing direction or a motion of at least one eye of the user, and wherein the processing module further comprises a visual recognition module which is adapted to convert at least one of the detected viewing direction or the detected motion into a third input signal to be transmitted via the transceiver to the machine in the beverage industry to control the settings or the operations of the machine in the beverage industry or the at least one component of the machine.

12. The eyeglasses of claim 9, wherein the processing module is further to receive, from a mobile device that is in communication with the eyeglasses, a fourth input signal to be transmitted to the machine in the beverage industry to control the settings or the operations of the machine in the beverage industry or the at least one component of the machine.

13. The eyeglasses of claim 9, wherein the operating system is adapted to operate the HMI of the machine without the user touching the machine and without the user touching control elements on the machine.

14. The eyeglasses of claim 9, wherein the operating system comprises a positioning system for detecting at least one of a position or orientation of the eyeglasses and is adapted to select the first control element and the information of the HMI to be displayed based on the at least one of the position or the orientation of the eyeglasses.

15. The eyeglasses of claim 9, wherein at least one of the first control element or the information of the HMI are displayed in the eyeglasses.

16. The eyeglasses of claim 9, wherein the display system is at least one of a head-mounted display, a virtual retina display, or a projector.

17. A processing module of eyeglasses for a user of an operating system, wherein the operating system is for a machine in a beverage industry, wherein the machine is at least one of a beverage processing machine or a container treatment machine, and wherein the processing module comprises: a speech recognition module to convert speech information received via a microphone of the eyeglasses into a first input signal to be transmitted via a transceiver of the eyeglasses to the machine to control settings or operations of the machine in the beverage industry or at least one component of the machine and to convert the speech information into a second input signal to control a menu of a human machine interface (HMI) displayed on a display system of the eyeglasses, wherein the speech information is received with respect to a first control element and information of the HMI displayed via the display system of the eyeglasses, the HMI being for controlling the settings or the operations of the machine in the beverage industry or the at least one component of the machine, wherein the processing module is adapted to: cause one or more first input signals to be transmitted via the transceiver to the machine for controlling the settings or the operations of the machine in the beverage industry or the at least one component of the machine: and cause one or more second input signals to control the HMI displayed on the display system of the eyeglasses.

18. The processing module of claim 17, wherein the processing module further comprises a visual recognition module to convert a gesture received via an external camera of the eyeglasses into a third input signal to be transmitted via the transceiver to the machine in the beverage industry to control the settings or the operations of the machine in the beverage industry or the at least one component of the machine.

19. The processing module of claim 17, wherein the processing module further comprises a visual recognition module which is adapted to convert at least one of a viewing direction or a detected motion of at least one eye of the user detected by an internal camera of the eyeglasses into a third input signal to be transmitted via the transceiver to the machine in the beverage industry to control the settings or the operations of the machine in the beverage industry or the at least one component of the machine.

20. The processing module of claim 17, wherein the processing module is further to receive, from a mobile device that is in communication with the eyeglasses, a fourth input signal to be transmitted to the machine in the beverage industry to control the settings or the operations of the machine in the beverage industry or the at least one component of the machine.

\* \* \* \* \*